United States Patent
Shinohara et al.

(10) Patent No.: US 12,524,292 B2
(45) Date of Patent: Jan. 13, 2026

(54) ANALYSIS DEVICE, ANALYSIS METHOD, AND ANALYSIS PROGRAM

(71) Applicant: NTT, Inc., Tokyo (JP)

(72) Inventors: Masanori Shinohara, Tokyo (JP); Takaaki Koyama, Tokyo (JP); Yukio Nagafuchi, Tokyo (JP); Makiko Aoyagi, Tokyo (JP); Yasuhiro Teramoto, Tokyo (JP)

(73) Assignee: NTT, Inc., Tokyo (JP)

( * ) Notice: Subject to any disclaimer, the term of this patent is extended or adjusted under 35 U.S.C. 154(b) by 136 days.

(21) Appl. No.: 18/566,582

(22) PCT Filed: Jun. 10, 2021

(86) PCT No.: PCT/JP2021/022220
§ 371 (c)(1),
(2) Date: Dec. 1, 2023

(87) PCT Pub. No.: WO2022/259496
PCT Pub. Date: Dec. 15, 2022

(65) Prior Publication Data
US 2024/0256376 A1 Aug. 1, 2024

(51) Int. Cl.
*G06F 11/07* (2006.01)

(52) U.S. Cl.
CPC ...... *G06F 11/0787* (2013.01); *G06F 11/0709* (2013.01)

(58) Field of Classification Search
CPC .................................................. G06F 11/0787
(Continued)

(56) References Cited

U.S. PATENT DOCUMENTS 11,539,595 B1 * 12/2022 Hatton ................ H04L 41/0631
2013/0179220 A1 * 7/2013 Notani ................ G06Q 30/0202
705/7.31
(Continued)

FOREIGN PATENT DOCUMENTS

JP 2020005184 A 1/2020
JP 2020135655 A 8/2020

OTHER PUBLICATIONS

NOZOMI Networks (2020) "Data Sheet: Guardian; Industrial Strenghth OT and IoT Security and Visibility" [online] Accessed on May 25, 2021, website: <URL : https://www.exclusive-networks.com/fr/wp-content/uploads/ites/17/2020/12/FR-VR-Nozomi-Networks-Guardian.pdf >.

(Continued)

*Primary Examiner* — Lan Dai T Truong

(57) ABSTRACT

An analysis server accumulates an alert of communication determined not to be normal communication on the basis of a model indicating a feature of normal communication in a storage unit. Then, the analysis server performs clustering of alerts obtained by excluding an alert having a different category variable from communication data used for learning of the model from the accumulated alerts by using a feature amount of communication included in the alert. Thereafter, the analysis server determines, for each cluster generated by clustering, whether or not the cluster includes the same type of alert. Then, the analysis server outputs a result of clustering and a determination result as to whether or not each cluster includes the same type of alert.

9 Claims, 8 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2015/0117174 | A1* | 4/2015 | Alber | G11B 17/00 |
| | | | | 369/53.41 |
| 2015/0318021 | A1* | 11/2015 | Nishimura | A61B 1/041 |
| | | | | 386/230 |
| 2016/0364467 | A1* | 12/2016 | Gupta | G06F 16/285 |
| 2019/0260793 | A1* | 8/2019 | Stockdale | H04L 63/101 |
| 2021/0160270 | A1 | 5/2021 | Minami et al. | |
| 2021/0326744 | A1* | 10/2021 | Israel | G06N 5/02 |
| 2022/0141185 | A1 | 5/2022 | Tyou et al. | |

OTHER PUBLICATIONS

Meng et al. (2018) "An Effective High Threating Alarm Mining Method for Cloud Security Management", IEEE Access, vol. 6, pp. 22634-22644, XP011683213.

Dingbang Xu (2006) "Correlation Analysis of Intrusion Alerts", Thesis; North Carolina State University, Jan. 1, 2006 (Jan. 1, 2006), pp. 1-194, XP055903232.

\* cited by examiner

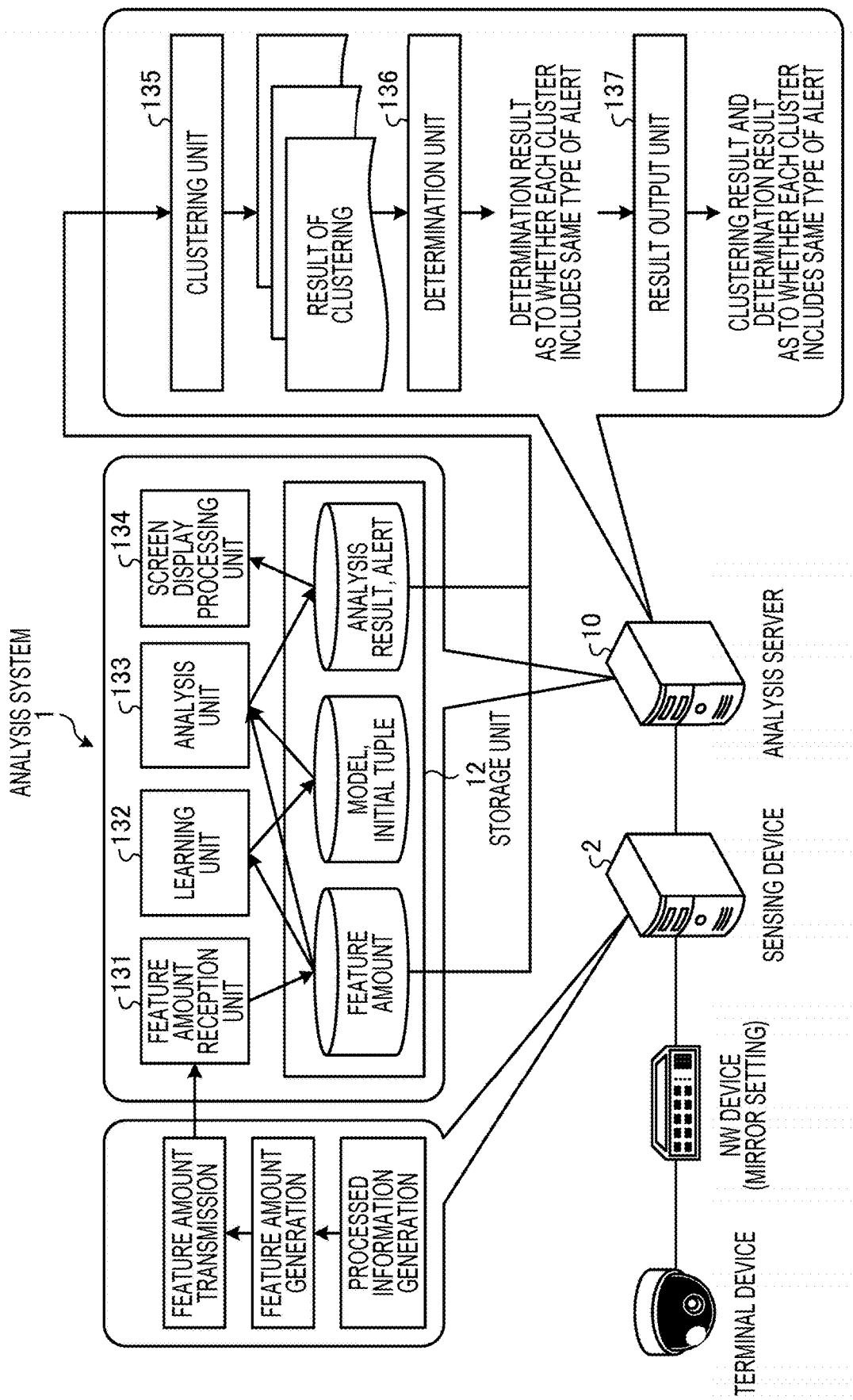

Fig. 2

| NAME OF ITEM OF FEATURE AMOUNT | |
|---|---|
| SESSION DURATION | DIFFERENCE FROM TIME OF INITIAL LEARNING IS TAKEN AND CONVERTED INTO LOGARITHMIC SCALE |
| FORWARD-DIRECTION TOTAL BYTE QUANTITY | DIFFERENCE FROM TIME OF INITIAL LEARNING IS TAKEN AND CONVERTED INTO LOGARITHMIC SCALE |
| FORWARD-DIRECTION TOTAL PACKET QUANTITY | DIFFERENCE FROM TIME OF INITIAL LEARNING IS TAKEN AND CONVERTED INTO LOGARITHMIC SCALE |
| REVERSE-DIRECTION TOTAL BYTE QUANTITY | DIFFERENCE FROM TIME OF INITIAL LEARNING IS TAKEN AND CONVERTED INTO LOGARITHMIC SCALE |
| REVERSE-DIRECTION TOTAL PACKET QUANTITY | DIFFERENCE FROM TIME OF INITIAL LEARNING IS TAKEN AND CONVERTED INTO LOGARITHMIC SCALE |

Fig. 7

| No. | COMMUNICATION LOAD CHARACTERISTIC | CLUSTER NUMBER | | | | | | | | | | | NUMBER OF ALL ALERTS | NUMBER OF ALERTS INCLUDED IN LARGEST CLUSTER | ALERT RATIO OF LARGEST CLUSTER | NUMBER OF ALERTS INCLUDED IN TOP THREE CLUSTERS |
|---|---|---|---|---|---|---|---|---|---|---|---|---|---|---|---|---|
| | | -1 | 0 | 1 | 2 | 3 | 4 | 5 | 6 | 7 | 8 | 9 | | | | |
| LOAD 1 | SMALL POSITIVE DIFFERENCE 1 ($10^{0.2}$ TIMES) | | 3 | 34 | 314 | 11 | 48 | | | | | | 410 | 314 | 76.6% | 396 |
| LOAD 2 | SMALL POSITIVE DIFFERENCE 2 ($10^{0.4}$ TIMES) | | 27 | | 2 | | 6 | | | | | 2 | 37 | 27 | 73.0% | 35 |
| LOAD 3 | LARGE POSITIVE DIFFERENCE 1 ($10^{1}$ TIMES) | | 4 | | | | 4 | | | | | 29 | 37 | 29 | 78.4% | 37 |
| LOAD 4 | LARGE POSITIVE DIFFERENCE 2 ($10^{1.2}$ TIMES) | | | | 2 | | 4 | | | | | 29 | 35 | 29 | 82.9% | 35 |
| LOAD 5 | LARGE POSITIVE DIFFERENCE 3 ($10^{1.4}$ TIMES) | | 5 | | | | 11 | 5 | 53 | | | | 74 | 53 | 71.6% | 69 |
| LOAD 6 | LARGE POSITIVE DIFFERENCE 4 ($10^{1.6}$ TIMES) | | | 1 | | 51 | 6 | | | 12 | | | 70 | 51 | 72.9% | 69 |
| LOAD 7 | SMALL NEGATIVE DIFFERENCE 1 ($10^{-0.2}$ TIMES) | | | | | | 1 | | | | 31 | | 33 | 31 | 93.9% | 33 |
| LOAD 8 | SMALL NEGATIVE DIFFERENCE 2 ($10^{-0.4}$ TIMES) | | | 3 | 7 | | 46 | | | | | | 56 | 46 | 82.1% | 56 |
| LOAD 9 | SMALL NEGATIVE DIFFERENCE 3 ($10^{-0.6}$ TIMES) | | | 2 | 63 | | 11 | | | | | | 76 | 63 | 82.9% | 76 |
| LOAD 10 | DIFFERENT COMMUNICATION TUPLE | 111 | | | | | | | | | | | 111 | | | |
| | TOTAL | | | | | | | | | | | | 939 | 643 | | 806 |

ANALYSIS DEVICE, ANALYSIS METHOD, AND ANALYSIS PROGRAM

CROSS-REFERENCE TO RELATED APPLICATIONS

This application is a U.S. 371 Application of International Patent Application No. PCT/JP2021/022220, filed on 10 Jun. 2021, the disclosure of which is hereby incorporated herein by reference in its entirety.

TECHNICAL FIELD

The present invention relates to an analysis device, an analysis method, and an analysis program for analyzing an alert indicating abnormality of communication.

BACKGROUND ART

In conventional art, in a case where abnormality detection of communication is performed on the basis of a model indicating a feature of normal communication, when new communication is added to communication to be detected, even when the added communication is normal communication, it is detected as abnormal (overdetected). As a result, there is a possibility that a large number of similar alerts occurs. Here, an operator determines whether the alert is due to overdetection for each alert for each terminal device. Therefore, when a large number of alerts occurs, the operation of the operator becomes enormous.

Thus, some techniques have been proposed to reduce the workload of the operator. For example, there is a technique in which, when a detection system presents an alert, those having the same category variable such as a type of threat indicated by the alert, a terminal device ID, a protocol, and a port number are presented together (see Non Patent Literature 1). In addition, there is a technique in which a detection system filters an alert by using a category variable such as an IP address, a port number, or a protocol number indicated by an alert, or a communication start date and time as a key (see Patent Literature 1 and 2).

CITATION LIST

Patent Literature

Patent Literature 1: JP 2020-005184 A
Patent Literature 2: JP 2020-135655 A

Non Patent Literature

Non Patent Literature 1: NOZOMI Guardian, [retrieved on May 25, 2021], the Internet <URL: https://www.exclusive-networks.com/fr/wp-content/uploads/sites/17/2020/12/FR-VR-Nozomi-Networks-Guardian.pdf>

SUMMARY OF INVENTION

Technical Problem

However, in any of the above techniques, it is not possible to group alerts of communication having the same feature such as communication destination or the like and having different data amounts or the like among alerts. In addition, according to the above technique, even when an attempt is made to group alerts on the basis of the data amount, when the number of items of the feature amount of grouping targets increases, the feature of each group becomes unclear. Therefore, even when alerts are grouped using the conventional art, enormous work is required to determine whether the alert is due to overdetection.

Thus, an object of the present invention is to solve the above-described problem and to reduce work required for determining whether an alert is due to overdetection.

Solution to Problem

In order to solve the above-described problem, the present invention includes: an accumulation unit that accumulates alerts of communication determined not to be normal communication on the basis of a model indicating a feature of normal communication; a clustering unit that performs clustering of the alerts by using a feature amount of communication included in the accumulated alerts; a determination unit that determines, for each of clusters generated by the clustering, whether or not the cluster includes the same type of alert; and a result output unit that outputs a result of the clustering and a determination result as to whether or not each of the clusters includes the same type of alert.

Advantageous Effects of Invention

According to the present invention, it is possible to reduce work required for determining whether an alert is due to overdetection.

BRIEF DESCRIPTION OF DRAWINGS

FIG. 1 is a diagram for describing a configuration example and an outline of an analysis system.
FIG. 2 is a diagram illustrating an example of items used by an analysis server for clustering of alerts.
FIG. 7 is a diagram illustrating an example of a result of clustering of alerts by the analysis server and a determination result of the same type of alert.

DESCRIPTION OF EMBODIMENTS

Figure 3:
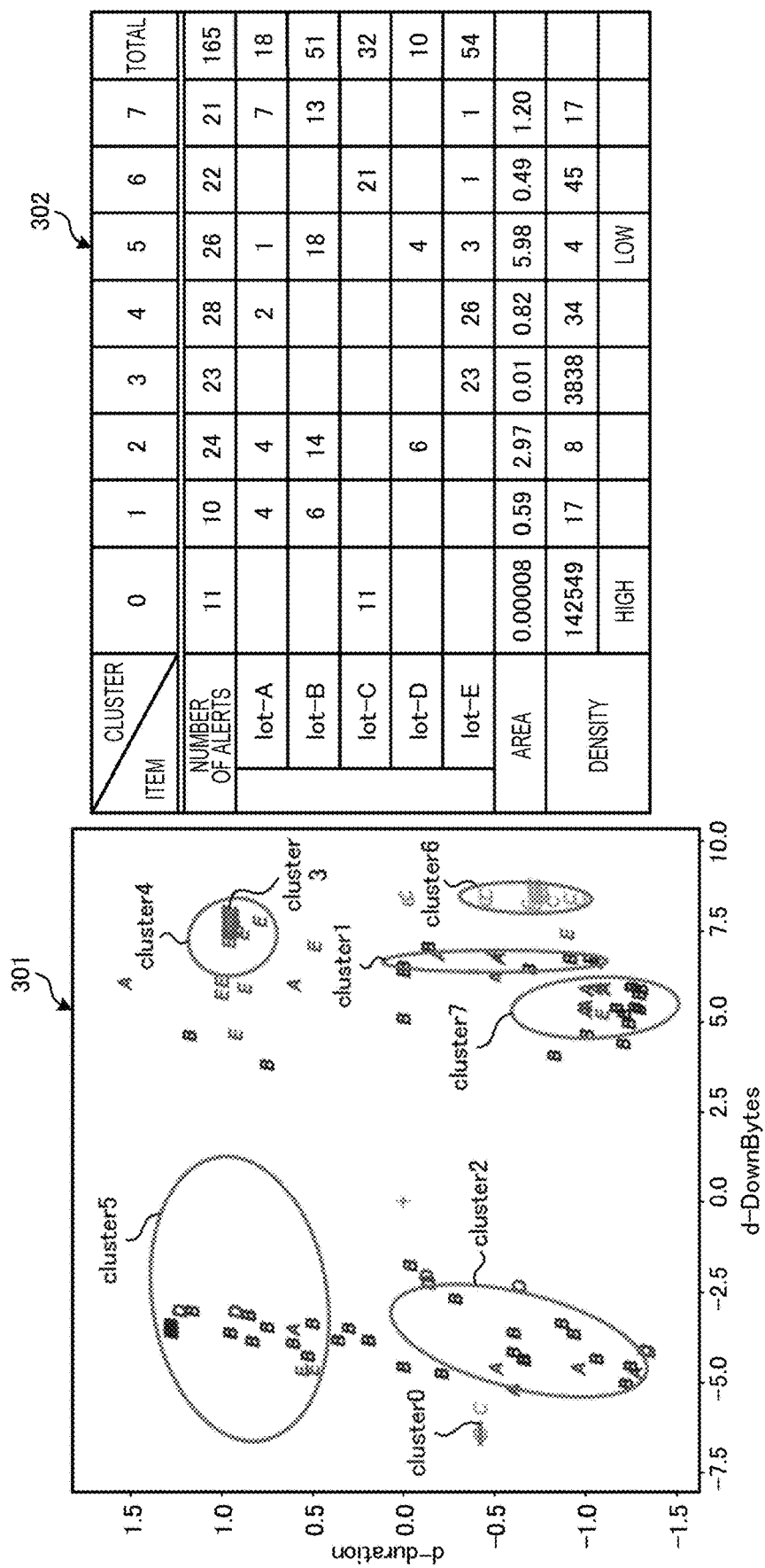
FIG. 3 is a diagram illustrating an example of clustering by the analysis server.

Hereinafter, a mode for carrying out the present invention (embodiment) will be described with reference to the drawings. The present invention is not limited to the embodiment described below.

[Outline]
First, an outline of an operation of an analysis system 1 including an analysis server (analysis device) 10 will be described with reference to FIG. 1.

The analysis system 1 includes a sensing device 2 and an analysis server 10. The sensing device 2 observes communication of a terminal device (for example, an IoT device).

For example, the sensing device 2 observes communication of a terminal device by mirror setting of a network (NW) device to which the terminal device is connected. Then, the sensing device 2 generates information (processed information) obtained by processing an observation result of communication of the terminal device, generates a feature amount of communication from the processed information, and transmits the feature amount to the analysis server 10.

Note that the feature amount of communication described above is, for example, information indicating an IP address of a terminal device that performs the communication, a transmission source IP address of a session, a transmission destination IP address of the session, a transmission destination port number of the session, a protocol number, session duration, a forward-direction total byte quantity, a forward-direction total packet quantity, a reverse-direction total byte quantity, a reverse-direction total packet quantity, or the like.

The analysis server 10 determines whether the communication is normal communication on the basis of the feature amount of communication transmitted from the sensing device 2 and the model indicating the feature of the normal communication, and outputs an alert when determining that the communication is abnormal.

For example, the analysis server 10 calculates an anomaly score indicating a deviation between the feature amount of communication transmitted from the sensing device 2 and the model indicating the feature of normal communication, and outputs an alert when the anomaly score exceeds a predetermined threshold value. Thereafter, the operator of the analysis system 1 checks the contents of the alert, and when the alert is due to overdetection, feeds back that fact. The feedback here is, for example, work in which the operator registers, in the analysis server 10, that the alert is due to overdetection so that an alert does not occur for the same type of feature amount in the analysis server 10 thereafter.

Here, when a large number of alerts occurs, the above check work by the operator becomes enormous. Thus, the analysis server 10 performs clustering of alerts so that the feature of each cluster clearly appears so that the operator can efficiently perform the above check work (can collectively perform the check work of the same type of alert).

For example, when performing clustering of alerts, the analysis server 10 excludes an alert of communication (for example, communication by a new terminal device) not included in communication data used for learning of the above model from a target of clustering. In addition, the analysis server 10 clusters alerts by using items of feature amount (for example, the session duration, the forward-direction total byte quantity, the forward-direction total packet quantity, the reverse-direction total byte quantity, the reverse-direction total packet quantity, or the like) in which communication features are likely to appear. Further, when clustering the alerts, the analysis server 10 performs clustering by taking a difference from the value used for learning the model for each item for each terminal device indicated by the alert and normalizing the value.

In this way, the analysis server 10 can perform clustering of the alerts such that the feature of each cluster clearly appears.

In addition, the analysis server 10 outputs a determination result as to whether or not each cluster includes the same type of alert. Hence, the operator can identify clusters that can be done by one overdetection determination since the clusters include the same type of alert. As a result, it is possible to reduce work required for determining whether an alert is due to overdetection.

In addition, since the analysis server 10 does not use payload information depending on a specific payload when performing clustering of alerts, it is also possible to cope with clustering of alerts of encrypted communication.

[Configuration Example]

Next, a configuration example of the analysis server 10 will be described with reference to FIG. 1. The analysis server 10 includes a storage unit 12, a feature amount reception unit 131, a learning unit 132, an analysis unit (accumulation unit) 133, a screen display processing unit 134, a clustering unit 135, a determination unit 136, and a result output unit 137.

The storage unit 12 stores information to be referred to when the analysis server 10 executes various processing and results of execution of various processing.

For example, the storage unit 12 stores a feature amount of communication acquired from the sensing device 2, a model indicating a feature of normal communication learned by the learning unit 132, a communication tuple (initial tuple) of a feature amount used for learning of the model, an analysis result (for example, the above anomaly score) of communication by the analysis unit 133, an alert group of communication determined not to be normal communication on the basis of the above model, or the like.

Note that, in the description described below, some of the category variables included in the feature amount are referred to as a communication tuple. Among them, the communication tuple of the feature amount used for learning of the model is referred to as an initial tuple. The initial tuple is, for example, the IP address of the terminal device, the transmission source IP address of the session, the transmission destination IP address of the session, the transmission destination port number of the session, the protocol number, and the like included in the feature amount used for learning of the model, but is not limited to the above five.

The feature amount reception unit 131 receives the feature amount of communication from the sensing device 2. Then, the feature amount reception unit 131 accumulates the received feature amount of communication in the storage unit 12. For example, the feature amount reception unit 131 first receives the feature amount of communication for learning of the model (feature amount of normal communication), and accumulates the feature amount in the storage unit 12. Thereafter, the feature amount reception unit 131 receives the feature amount of communication to be detected and accumulates the feature amount in the storage unit 12.

The learning unit 132 performs learning of the model indicating the feature of normal communication by using the feature amount of communication (feature amount of normal communication) accumulated in the storage unit 12. Thereafter, the learning unit 132 stores each parameter of the learned model and data (for example, initial tuple or the like) used for learning of the model in the storage unit 12.

The analysis unit 133 analyzes the communication to be detected using the model learned by the learning unit 132. For example, the analysis unit 133 calculates an anomaly score indicating a deviation between the feature amount of communication to be detected and the above model. Then, in a case where the anomaly score exceeds a predetermined threshold value (that is, in a case where there is a high possibility that the communication is not normal communication), the analysis unit 133 outputs an alert. The alert includes, for example, identification information of communication that is a target of an alert, a date and time of occurrence of the communication, and the like. The output alert is accumulated in the storage unit 12.

The screen display processing unit 134 displays the alert accumulated in the storage unit 12 on the screen. For example, the screen display processing unit 134 displays a list of alerts accumulated in the storage unit 12 on the screen on the basis of the instruction input by the operator. Hence, the operator can check on the screen what alert has been output.

The clustering unit 135 clusters the alerts on the basis of the feature amount of communication included in the alert accumulated in the storage unit 12.

For example, the clustering unit 135 acquires an alert and the feature amount of communication that is a target of the alert from the storage unit 12. Then, the clustering unit 135 clusters the alerts on the basis of the acquired feature amount of communication. Here, the clustering unit 135 narrows down the items of the feature amount used for clustering among the feature amounts of communication that is a target of the alert and performs normalization so that the feature of each cluster clearly appears.

For example, the clustering unit 135 excludes an alert of a communication tuple different from the communication tuple (initial tuple) of the feature amount used for learning of the model from the target of clustering. For example, the clustering unit 135 compares the communication tuple (initial tuple) of the feature amount used for learning of the model with the communication tuple of the feature amount of communication included in the alert, and excludes the alert having a different category variable (combination of the IP address of the terminal device itself, the transmission source IP address of the session, the transmission destination IP address of the session, the transmission destination port number of the session, and the protocol number) from the target of clustering.

In this way, the clustering unit 135 can exclude the alert for which the reason of the alert is clear, such as communication from a new terminal device, from the target of clustering.

In addition, the clustering unit 135 performs clustering by excluding information such as the date and time of occurrence of communication and the anomaly score from the information included in the alert. For example, the clustering unit 135 clusters the alerts by using at least one of the session duration, the forward-direction total byte quantity, the forward-direction total packet quantity, the reverse-direction total byte quantity, and the reverse-direction total packet quantity among the feature amounts of communication included in the alert.

Further, the clustering unit 135 clusters the alerts for each terminal device by using a value obtained by normalizing a difference between a value of the feature amount of communication used for learning of the model (value at the time of initial learning) and a value of the feature amount of the communication included in the alert.

For example, the clustering unit 135 calculates, for each terminal device, a difference from a value at the time of initial learning for each value of the session duration, the forward-direction total byte quantity, the forward-direction total packet quantity, the reverse-direction total byte quantity, and the reverse-direction total packet quantity among the feature amounts of communication in the alert. Then, the clustering unit 135 clusters the alerts by using a value obtained by converting the difference into a logarithmic scale (see FIG. 2).

An example of a result of clustering by the clustering unit 135 is indicated by reference numeral 301 in FIG. 3. Here, results (cluster0 to cluster7) of clustering, by the clustering unit 135, 165 alerts related to five terminal devices (Iot-A, Iot-B, Iot-C, Iot-D, and Iot-E) on the basis of the five feature amounts including the session duration, the forward-direction total byte quantity, the forward-direction total packet quantity, the reverse-direction total byte quantity, and the reverse-direction total packet quantity are illustrated. Note that reference numeral 301 indicates a state in which the results of the clustering above are viewed from a direction in which the session duration and the reverse-direction total byte quantity are axes.

Note that a clustering algorithm used by the clustering unit 135 is, for example, Birch, k-means, or the like. The user of the analysis server 10 can set what clustering algorithm the clustering unit 135 uses.

The description returns to FIG. 1. The determination unit 136 determines whether or not each cluster generated by the clustering unit 135 includes the same type of alert.

For example, the determination unit 136 determines whether or not each cluster includes the same type of alert on the basis of the ratio of the number of alerts of each cluster to all alerts, the number of terminal devices that are targets of the alert in each cluster, the density of each cluster, and the like.

For example, the determination unit 136 calculates a value of (the number of alerts constituting the cluster/the number of all alerts) for each cluster, and determines that a cluster whose value is equal to or greater than a predetermined threshold value (for example, 70%) is a cluster including an alert that is the same type of alert.

In addition, for example, the determination unit 136 calculates, for each cluster, how many terminal devices that are targets of the alert are included in the cluster, and determines that a cluster in which the calculated number is equal to or less than a predetermined threshold value (for example, one) is a cluster including the same type of alert.

In addition, for example, the determination unit 136 creates a scatter diagram of clusters, calculates the density of the clusters using the area of the clusters on the scatter diagram and the number of alerts included in the clusters, and determines that a cluster whose calculated density is equal to or greater than a predetermined threshold value is a cluster including the same type of alert. For example, the determination unit 136 calculates (the number of alerts constituting the cluster/the area of the cluster) for each cluster, and determines that a cluster whose the calculated value is equal to or greater than a predetermined threshold value (for example, 1000) is a cluster including the same type of alert.

For example, a case where the determination unit 136 determines that a cluster satisfying any one of conditions (1) to (3) described below is a cluster including the same type of alert on the basis of the information indicated by reference numeral 302 for clusters (cluster1 to cluster7) indicated by reference numeral 301 in FIG. 3 will be described.

(1) The ratio of the number of alerts of the cluster to all alerts is 70% or more
(2) The number of terminal devices that are targets of the alert in the cluster is one
(3) The density of the clusters is 1000 or more Note that the information indicated by reference numeral 302 is information indicating the number of alerts, the area, and the density of each terminal device (Iot-A, Iot-B, Iot-C, Iot-D, and Iot-E) for each cluster (cluster0 to cluster7) indicated by reference numeral 301.

Referring to the information indicated by reference numeral 302, there is no cluster in which the ratio of the number of alerts of the cluster to all the alerts is 70% or more. However, the cluster 0 (cluster0) is a cluster of only alerts of Iot-C and has a density of 1000 or more. In addition, the cluster 3 (cluster3) is also a cluster of only alerts of Iot-E and has a density of 1000 or more. Therefore, the determination unit 136 determines that cluster0 and cluster3 are clusters including the same type of alert.

The description returns to FIG. 1. The result output unit 137 outputs a result of clustering by the clustering unit 135 and a determination result by the determination unit 136 as to whether or not each cluster includes the same type of alert.

For example, the result output unit 137 outputs the result of clustering indicated by reference numeral 301 in FIG. 3 and information indicating that cluster0 and cluster3 are clusters including the same type of alert among the clusters (cluster1 to cluster7) indicated by reference numeral 301.

With such an analysis server 10, it is possible to generate a cluster in which the feature of each cluster clearly appears when clustering of alerts is performed. In addition, the analysis server 10 outputs a determination result as to whether or not each cluster includes the same type of alert. Hence, the operator can identify clusters that can be done by one overdetection determination. As a result, it is possible to reduce work required for determining whether an alert is due to overdetection.

[Example of Processing Procedure]

Next, an example of a processing procedure of the analysis server 10 will be described with reference to FIGS. 4 and 5. First, processing in which the analysis server 10 accumulates alerts will be described with reference to FIG. 4, and next, processing in which the analysis server 10 performs clustering of the accumulated alerts will be described with reference to FIG. 5.

Figure 4:
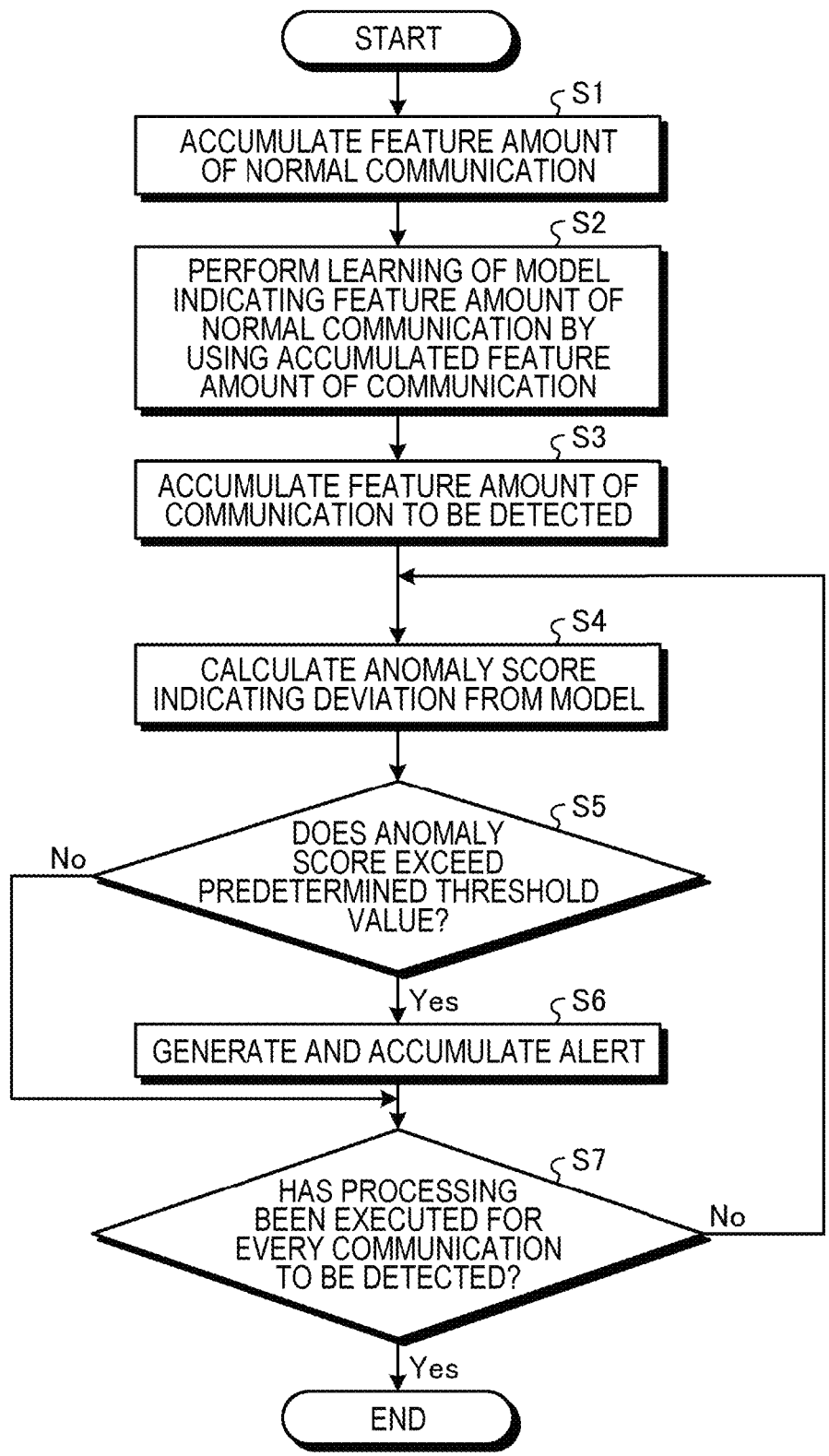
FIG. 4 is a flowchart illustrating an example of a processing procedure of the analysis server.

First, the feature amount reception unit 131 of the analysis server 10 accumulates the feature amount of communication (the feature amount of normal communication) transmitted from the sensing device 2 in the storage unit 12 (S1 in FIG. 4). Next, the learning unit 132 performs learning (initial learning) of a model indicating the feature of normal communication by using the feature amount of communication accumulated in S1 (S2).

When the learning of the model in S2 is completed, the feature amount reception unit 131 accumulates the feature amount of communication to be detected in the storage unit 12 (S3). Then, the analysis unit 133 calculates an anomaly score indicating a deviation between the feature amount of communication to be detected and the model learned in S2 (S4).

Here, when determining that the anomaly score calculated in S4 exceeds the predetermined threshold value (Yes in S5), the analysis unit 133 generates an alert of the communication, and accumulates the alert in the storage unit 12 (S6). Then, when the processing has not yet been executed for any of the communication to be detected (No in S7), the analysis server 10 executes the processing of S4 and subsequent steps for the communication to be detected for which the processing has not been executed yet. On the other hand, when the processing has been executed for all the communication to be detected (Yes in S7), the analysis server 10 ends the processing.

In addition, when the analysis unit 133 determines that the anomaly score calculated in S4 is less than or equal to the predetermined threshold value (No in S5), and the processing has not yet been executed for any of the communication to be detected (No in S7), the processing of S4 and subsequent steps is executed for the communication to be detected for which the processing has not yet been executed.

Next, processing in which the analysis server 10 performs clustering of the accumulated alerts will be described with reference to FIG. 5.

Figure 5:
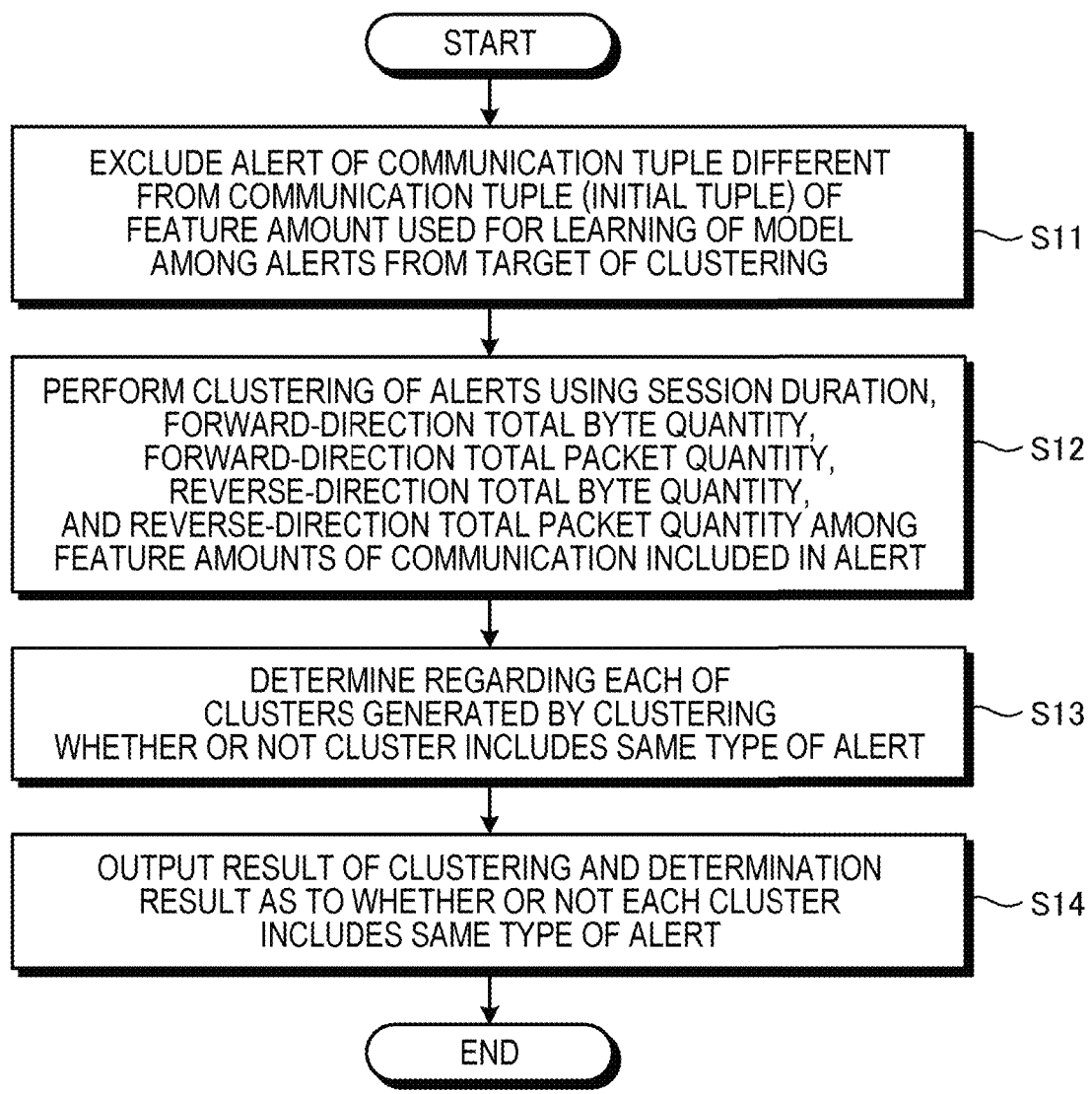
FIG. 5 is a flowchart illustrating an example of a processing procedure of the analysis server.

First, the clustering unit 135 of the analysis server 10 excludes an alert of a communication tuple different from the communication tuple (initial tuple) of the feature amount used for learning of the model from the target of clustering among the alerts accumulated in the storage unit 12 (S11 in FIG. 5).

For example, the clustering unit 135 compares the communication tuple (initial tuple) used for learning of the model with the communication tuple of the feature amount of communication included in the alert, and excludes the alert having a different category variable (combination of the IP address of the terminal device, the transmission source IP address of the session, the transmission destination IP address of the session, the transmission destination port number of the session, and the protocol number) with respect to the initial tuple from the target of clustering.

After S11, the clustering unit 135 clusters the alerts on the basis of the session duration, the forward-direction total byte quantity, the forward-direction total packet quantity, the reverse-direction total byte quantity, and the reverse-direction total packet quantity among the feature amounts of communication included in the alert (S12).

After S12, the determination unit 136 determines regarding clusters generated by the clustering in S12 whether or not each cluster includes the same type of alert (S13).

For example, the determination unit 136 determines whether or not each cluster includes the same type of alert on the basis of the ratio of the number of alerts of each cluster to all alerts, the number of terminal devices that are targets of the alert in each cluster, the density of each cluster, and the like.

After S13, the result output unit 137 outputs a result of the clustering in S12 and a determination result as to whether or not each cluster includes the same type of alert in S13 (S14).

[Example of Response to Alert by Operator]

Figure 6:
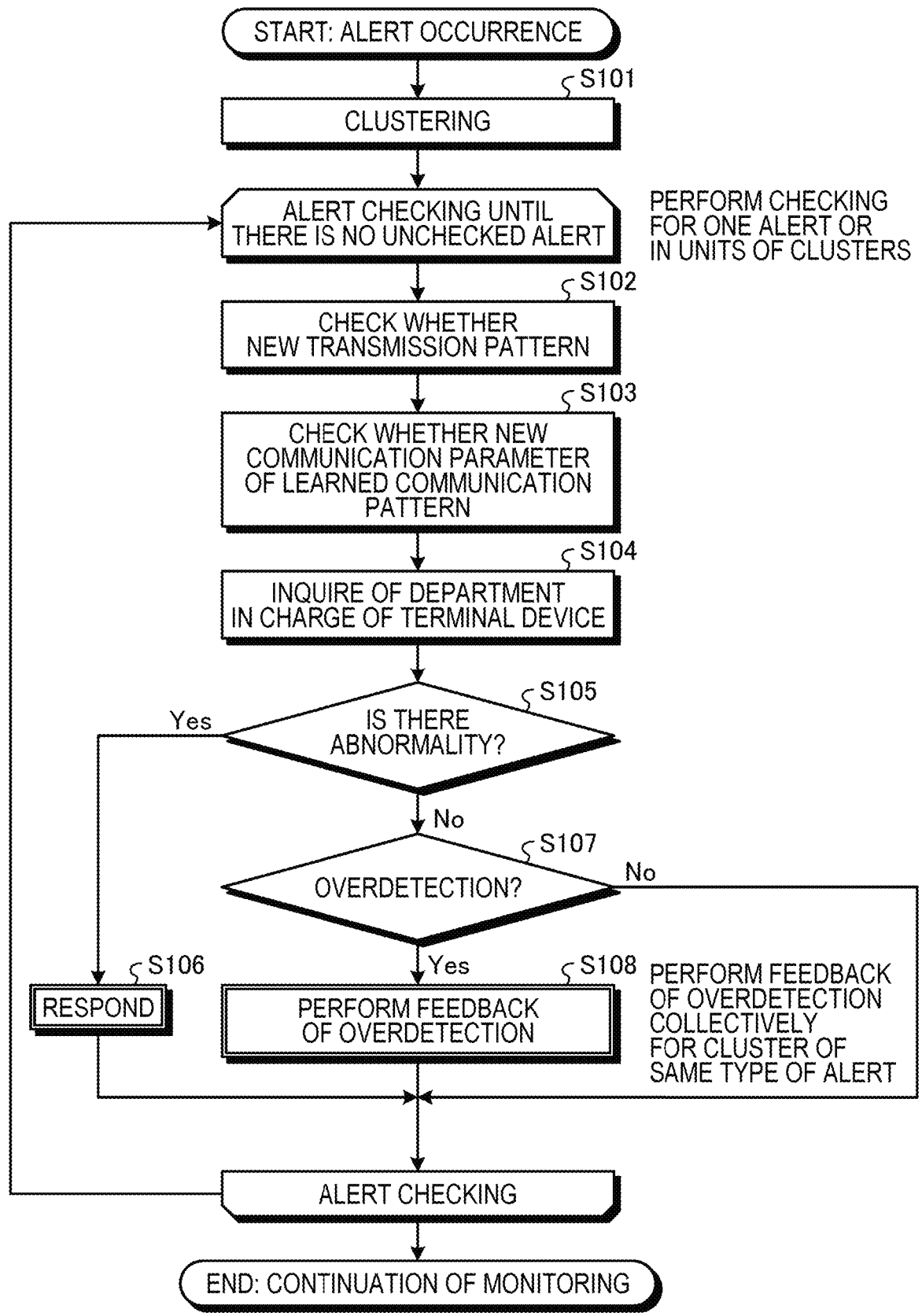
FIG. 6 is a diagram illustrating an example of response to an alert by an operator using a result of clustering of alerts by the analysis server.

Next, an example of response to an alert by the operator using the result of the clustering of alerts and the determination result as to whether each cluster includes the same type of alert output by the analysis server 10 will be described with reference to FIG. 6. For example, after the alert occurs, the analysis server 10 clusters the alerts and determines whether or not each cluster includes the same type of alert (S101: clustering).

Then, the operator checks the alert by using the result of clustering of the alerts above and the determination result as to whether or not each cluster includes the same type of alert. For example, the operator performs alert checking processing indicated in S102 to S108 for each alert or in units of clusters until there is no unchecked alert.

First, the operator checks whether a communication pattern that is a target of the alert is a new communication pattern that has not been present at the time of learning of the model (S102). In addition, the operator checks whether or not a communication parameter that is a target of the alert is a new communication parameter of a learned communication pattern (S103). On the basis of the above check result, the operator inquires of a department in charge of the terminal device that is a target of the alert (S104). Then, as a result of the inquiry, when there is an abnormality in the terminal device (Yes in S105), the operator takes a measure corresponding to the abnormality (S106). Then, the alert checking processing ends. Thereafter, the analysis server 10 continues monitoring.

On the other hand, when there is no abnormality in the terminal device as a result of the inquiry (No in S105), the operator determines whether the alert is due to overdetection (S107). Then, when determining that the alert is due to overdetection (Yes in S107), the operator performs feedback of overdetection (S108). At this time, the operator collectively performs feedback of overdetection for clusters of the same type of alert.

On the other hand, when determining that the alert is not due to overdetection (No in S107), the operator does not take any measure, and ends the alert checking processing. Then, the analysis server 10 continues monitoring the communication of the terminal device.

In this manner, the analysis server 10 outputs the result of the clustering of the alerts and the determination result as to whether or not each cluster includes the same type of alert, so that the operator can perform determination regarding overdetection in units of clusters for clusters of the same type of alert and perform the feedback. As a result, it is possible to reduce work required for determining whether an alert is due to overdetection.

[Experimental Result of Clustering]

Next, an experimental result of clustering of alerts by the analysis server 10 will be described with reference to FIG. 7. Here, the analysis server 10 applies ten patterns of loads (changes with respect to communication) including two types of loads with a small positive difference (100.2 times and 100.4 times), four types of loads with a large positive difference (101 times, 101.2 times, 101.4 times, and 101.6 times), three types of loads with a small negative difference (10-0.2 times, 10-0.4 times, and 10-0.6 times), and a load of different communication tuple (difference due to category variable) as compared with communication in a normal state to the communication to be processed, and generates an alert. In addition, the analysis server 10 uses Birch as an alert clustering algorithm, and sets the number of clusters to be ten at maximum.

FIG. 7 illustrates a result of clustering of the alerts related to the above ten patterns of communication by the analysis server 10 on the basis of the above condition. As illustrated in FIG. 7, the number of alerts included in the largest cluster in which the alert ratio exceeds 70% among 828 alerts excluding alerts due to different communication tuple was 643.

Here, the analysis server 10 determines that the above largest cluster in which the alert ratio exceeds 70% is a cluster including the same type of alert and outputs the determination result, so that the operator can collectively perform determination regarding overdetection for the cluster. Hence, since the above 643 alerts are compressed to 9 (1 for each load), the number of cases determined for overdetection by the operator is reduced from 939 to 305 (reduced by 67.5%).

[System Configuration or the Like]

In addition, each component of each unit illustrated in the drawings is functionally conceptual and does not necessarily need to be physically configured as illustrated in the drawings. In other words, a specific form of distribution and integration of individual devices is not limited to the illustrated form, and all or part thereof can be functionally or physically distributed and integrated in any unit according to various loads, usage conditions, and the like. Further, all or any part of each processing function performed in each device can be implemented by a CPU and a program to be executed by the CPU or can be implemented as hardware by wired logic.

In addition, in the processing described in the above embodiment, all or part of processing described as being automatically performed may be manually performed, or all or part of processing described as being manually performed may be automatically performed by a known method. The processing procedure, the control procedure, the specific name, and the information including various types of data and parameters that are illustrated in the literatures and the drawings above can be freely changed unless otherwise specified.

[Program]

The analysis server 10 described above can be implemented by installing a program in a desired computer as packaged software or online software. It is possible to cause, for example, an information processing device to execute the above program, thereby causing the information processing device to function as the analysis server 10. The information processing device mentioned here includes a desktop or a laptop personal computer. In addition, the information processing device also includes mobile communication terminals such as a smartphone, a mobile phone, and a personal handy-phone system (PHS) and terminals such as a personal digital assistant (PDA).

In addition, in a case where a terminal apparatus used by a user is implemented as a client, the analysis server 10 can be implemented as a server device that provides a service regarding the above processing for the client. In this case, the server device may be implemented as a web server or may be implemented as a cloud that provides a service regarding the above processing by outsourcing.

Figure 8:
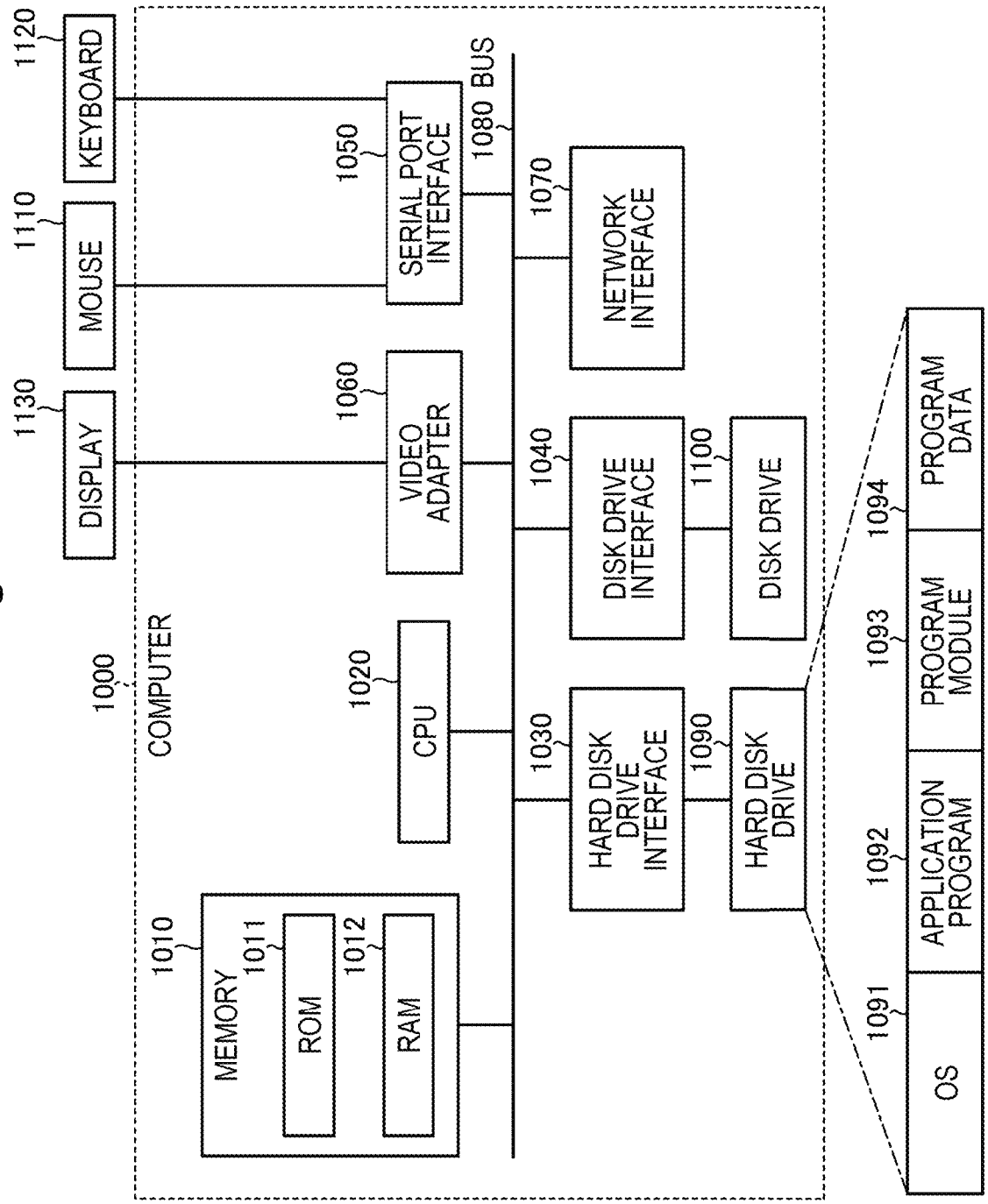
FIG. 8 is a diagram illustrating a configuration example of a computer that executes an analysis program.

FIG. 8 illustrates an example of a computer that executes an analysis program. A computer 1000 includes, for example, a memory 1010 and a CPU 1020. In addition, the computer 1000 also includes a hard disk drive interface 1030, a disk drive interface 1040, a serial port interface 1050, a video adapter 1060, and a network interface 1070. These units are connected to each other by a bus 1080.

The memory 1010 includes read only memory (ROM) 1011 and random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to, for example, a mouse 1110 and a keyboard 1120. The video adapter 1060 is connected with, for example, a display 1130.

The hard disk drive 1090 stores, for example, an OS 1091, an application program 1092, a program module 1093, and program data 1094. That is, a program that defines each processing executed by the above analysis server 10 is implemented as the program module 1093 in which a code executable by the computer is written. The program module 1093 is stored in, for example, the hard disk drive 1090. For example, the program module 1093 for executing processing similar to that of the functional configuration in the analysis server 10 is stored in the hard disk drive 1090. Note that the hard disk drive 1090 may be replaced with a solid state drive (SSD).

In addition, data to be used in the processing of the above embodiment is stored in, for example, the memory 1010 or the hard disk drive 1090 as the program data 1094. Then, the CPU 1020 reads the program module 1093 and the program data 1094 stored in the memory 1010 and the hard disk drive 1090 to the RAM 1012 as necessary and executes the program module 1093 and the program data 1094.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from another computer via the network interface 1070.

REFERENCE SIGNS LIST

1 Analysis system
2 Sensing device
10 Analysis server
12 Storage unit
131 Feature amount reception unit
132 Learning unit
133 Analysis unit (accumulation unit)
134 Screen display processing unit
135 Clustering unit
136 Determination unit
137 Result output unit

The invention claimed is:

1. An analysis device comprising:
a memory; and
a processor coupled to the memory and programmed to execute a process comprising:
accumulating alerts of communication determined not to be normal communication on a basis of a model as trained predicts a feature of normal communication;
performing clustering of the accumulated alerts according to respective feature amounts of communications as described in respective accumulated alerts of the accumulated alerts, wherein a feature amount of communication of an alert comprises an address of a device as a part of the communication, a duration of a session of the communication, and a volume of transmitted data in the communication;
determining, for each cluster of clusters generated by the clustering, whether or not said each cluster comprises a plurality of alerts indicating a same type of alert, wherein the same type of alert represents over detection of an alert based on normalcy of operating the device associated with the plurality of alerts; and
outputting a result of the clustering and a determination result as to whether or not said each cluster of the clusters comprises the plurality of alerts indicating the same type of alert.

2. The analysis device according to claim 1, wherein the process further comprises, excluding, based on a comparison between a learning feature amount of communication used for learning of the model and the feature amount of communication of the alert, the alert from the clustering operation, wherein the feature amount of communication further comprises an IP address of a terminal device of the communication, a transmission source IP address of a session, a transmission destination IP address of the session, a transmission destination port number of the session, and a protocol number.

3. The analysis device according to claim 1, wherein the performing clustering of the accumulated alerts performs clustering by using at least one of a forward-direction total byte quantity, a forward-direction total packet quantity, a reverse-direction total byte quantity, and a reverse-direction total packet quantity among feature amounts of communication included in the alert.

4. The analysis device according to claim 1, wherein the performing clustering of the accumulated alerts performs clustering by calculating, for each terminal device, a difference between a value of a feature amount of communication used for learning of the model and a value of a feature amount of the communication included in the alert, and using a value obtained by converting the value of the difference of the feature amount into a logarithmic scale.

5. The analysis device according to claim 1, wherein the determining determines that, for each of the generated clusters, a cluster in which a ratio of a number of alerts constituting the cluster to a number of all alerts is equal to or greater than a predetermined threshold value is a cluster including an alert of a same type of alert.

6. The analysis device according to claim 1, wherein the process further comprises calculating, for each of the generated clusters, how many terminal devices that are targets of an alert are included in the cluster, and the determining determines that a cluster in which the calculated number is equal to or less than a predetermined threshold value is a cluster including an alert of a same type of alert.

7. The analysis device according to claim 1, wherein the process further comprises creating a scatter diagram of the generated clusters, calculates a density of the clusters using an area of clusters on the scatter diagram and a number of alerts included in the clusters, and the determining determines that a cluster whose calculated density is equal to or greater than a predetermined threshold value is a cluster including a same type of alert.

8. An analysis method executed by an analysis device, the analysis method comprising:
accumulating alerts of communication determined not to be normal communication on a basis of a model as trained predicts a feature of normal communication;
performing clustering of the accumulated alerts according to respective feature amounts of communications as described in respective accumulated alerts of the accumulated alerts, wherein a feature amount of communication of an alert comprises an address of a device as a part of the communication, a duration of a session of the communication, and a volume of transmitted data in the communication;
determining, for each cluster of clusters generated by the clustering, whether or not said each cluster comprises a plurality of alerts indicating a same type of alert, wherein the same type of alert represents over detection of an alert based on normalcy of operating the device associated with the plurality of alerts; and
outputting a result of the clustering and a determination result as to whether or not said each cluster of the clusters comprises the plurality of alerts indicating the same type of alert.

9. A non-transitory computer readable storage medium having stored therein an analysis program causing a computer to execute a process comprising the steps of:
accumulating alerts of communication determined not to be normal communication on a basis of a model as trained predicts a feature of normal communication;
performing clustering of accumulated alerts according to respective feature amounts of communications as described in respective accumulated alerts of the accumulated alerts, wherein a feature amount of communication of an alert comprises an address of a device as a part of the communication, a duration of a session of the communication, and a volume of transmitted data in the communication;

determining, for each cluster of clusters generated by the clustering, whether or not said each cluster comprises a plurality of alerts indicating a same type of alert, wherein the same type of alert represents over detection of an alert based on normalcy of operating the device associated with the plurality of alerts; and outputting a result of the clustering and a determination result as to whether or not said each cluster of the clusters comprises the plurality of alerts indicating the same type of alert.

* * * * *